Sept. 13, 1927.  
C. J. TUCKER ET AL  
1,642,469  
APPARATUS FOR DRYING HAY OR OTHER PRODUCTS  
Filed July 13, 1926  
3 Sheets-Sheet 1
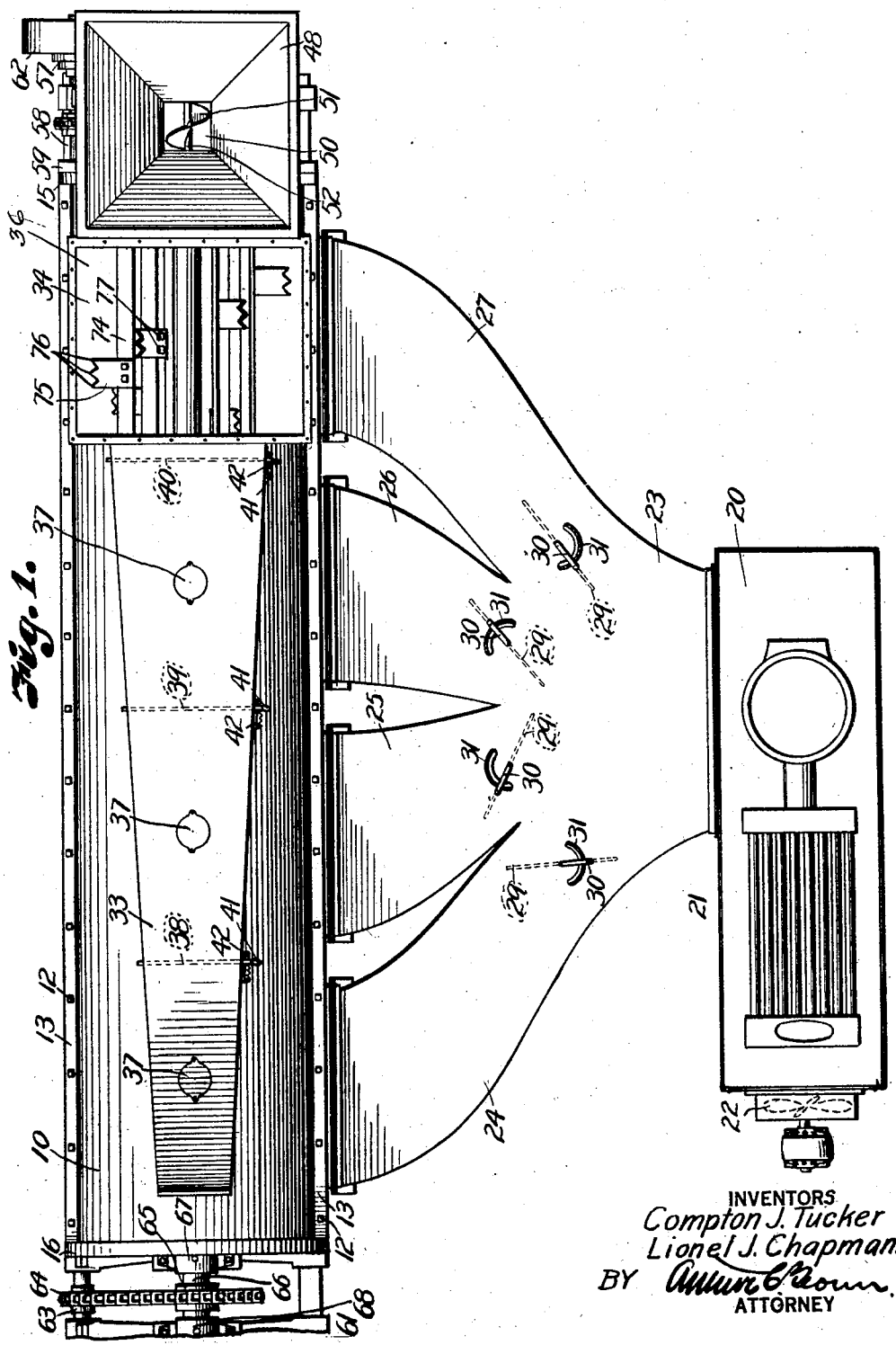
INVENTORS  
Compton J. Tucker  
Lionel J. Chapman.  
BY  
ATTORNEY Sept. 13, 1927. 1,642,469
C. J. TUCKER ET AL
APPARATUS FOR DRYING HAY OR OTHER PRODUCTS
Filed July 13, 1926  3 Sheets-Sheet 2
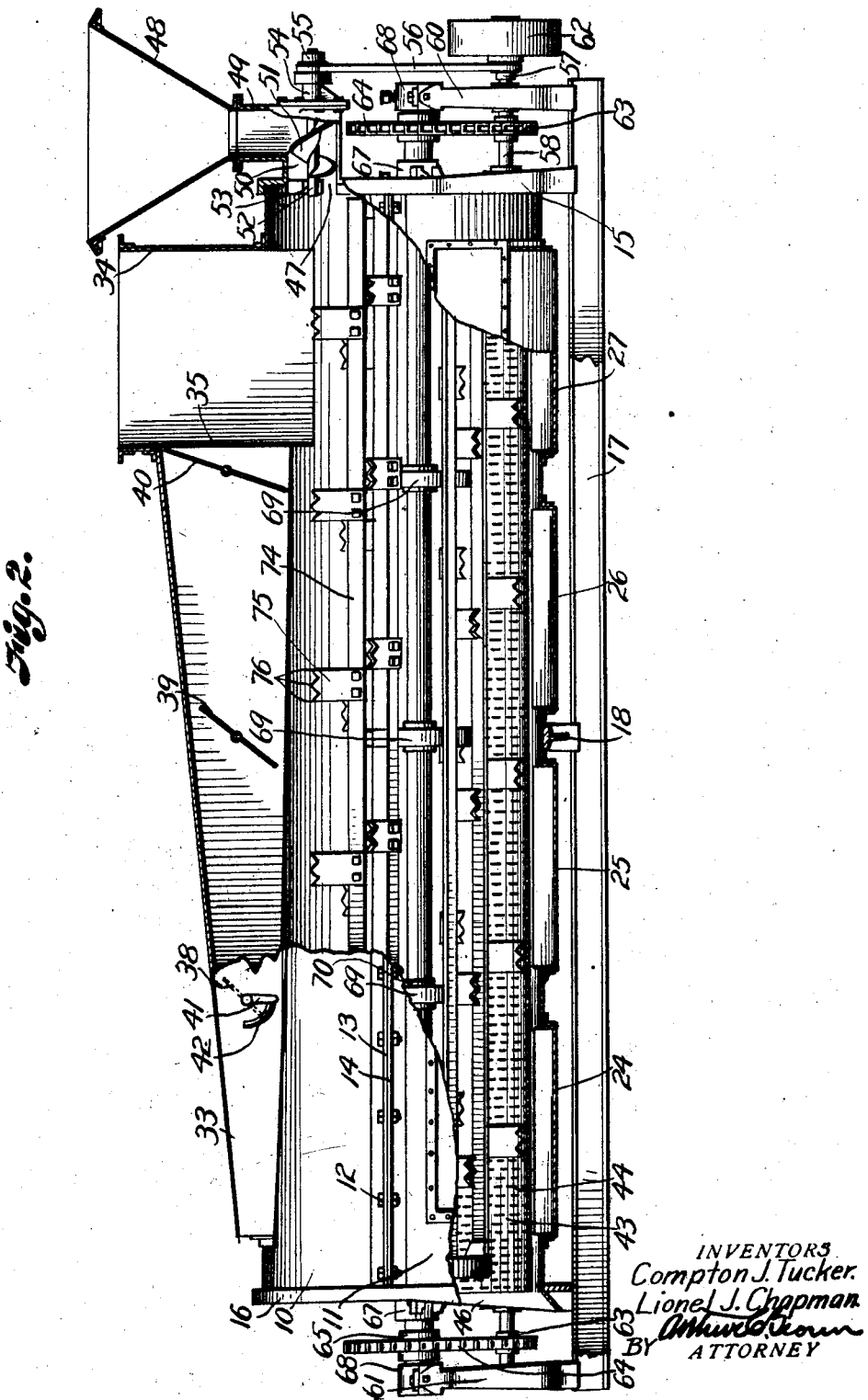
INVENTORS
Compton J. Tucker.
Lionel J. Chapman.
BY ATTORNEY Sept. 13, 1927.　　　　C. J. TUCKER ET AL　　　1,642,469
APPARATUS FOR DRYING HAY OR OTHER PRODUCTS
Filed July 13, 1926　　　3 Sheets-Sheet 3
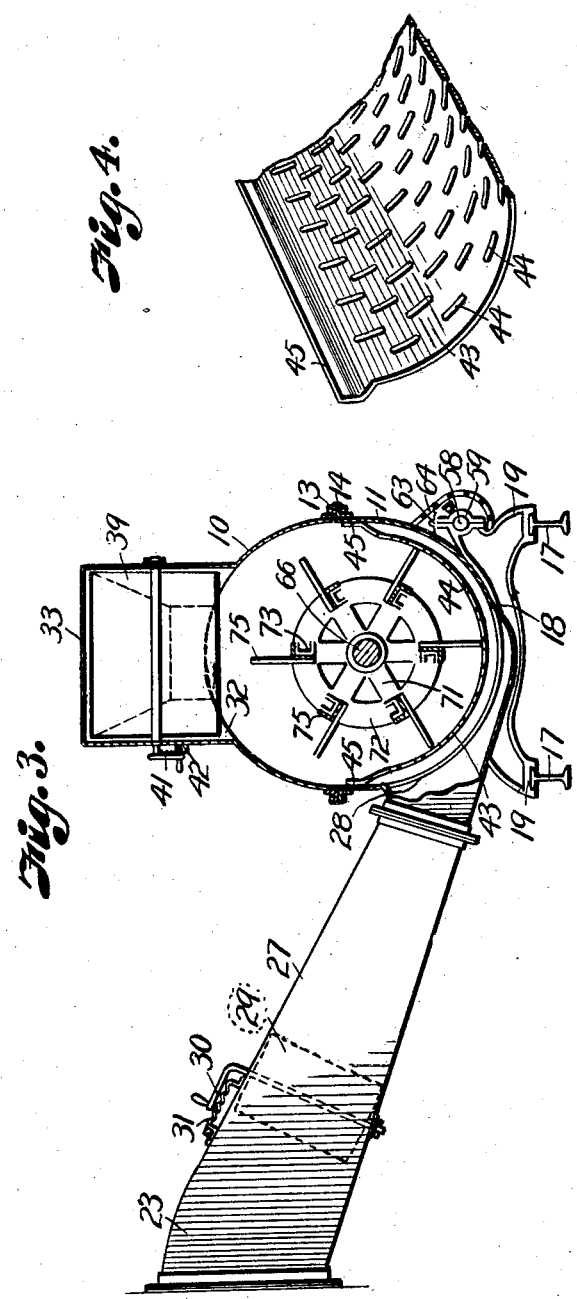
INVENTORS
Compton J. Tucker.
Lionel J. Chapman.
BY
ATTORNEY Patented Sept. 13, 1927.

1,642,469

UNITED STATES PATENT OFFICE.

COMPTON J. TUCKER, OF LEES SUMMIT, AND LIONEL J. CHAPMAN, OF KANSAS CITY, MISSOURI.

APPARATUS FOR DRYING HAY OR OTHER PRODUCTS.

Application filed July 13, 1926. Serial No. 122,143.

Our invention relates to drying apparatus and more particularly to a drying apparatus for hay or similar products.

It is a purpose of our invention to provide a new and improved apparatus for drying alfalfa hay or similar material so that the desired color and protein content of the material is maintained in the drying operation. In drying or curing alfalfa hay in the manner previously used it has been difficult to maintain any uniformity in results because the heat of the outside air was depended upon to do the drying, and the action of the sun particularly after the hay had become wet due to rain, produced undesirable results, particularly in affecting the color of the product. In carrying out our invention the alfalfa is cut up in its uncured condition so as to be in relatively short lengths prior to being introduced into the drying apparatus, and the drying is then carried on in a continuous process mechanically under controlled conditions so as to obtain substantially uniform results.

Our improved apparatus for drying the hay or similar material comprises an elongated housing forming a horizontally extending chamber into which the material to be dried is fed at one end thereof and discharged at the other end thereof, heat being supplied to said housing and the drying action being carried on therein exteriorly of the housing and is conducted to various points along the housing so as to obtain a distribution of warm dry air along the entire length of the housing.

It is more particularly a purpose of the invention to provide a device of the above mentioned character in which the supply of heated air is controlled at various points along the length of the housing and the discharge thereof is controlled also at different points along the length of the housing.

In the preferred form our invention comprises an elongated housing which has a perforated shelf-like wall member spaced from the bottom thereof, the heated air entering below said perforated shelf-like portion and passing therethrough upwardly toward the discharge conduit leading from said housing, and preferably an agitating device is provided above said perforated wall portion.

It is furthermore a purpose of our invention to provide agitating means for the drying apparatus comprising a rotatable member situated above the perforated wall portion and having projecting agitating means thereon that collectively move the material to be dried from the end of the housing into which the material is fed to the end thereof from which the material is discharged. In order to accomplish this purpose the projecting agitating members are preferably arranged spirally on the rotatable member. The feeding apparatus for the device preferably comprises a hopper into which the chopped material is dumped and from which a power feed apparatus such as a feed screw positively feeds the material into the upper portion of the housing at one end thereof.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes and modifications of parts as would occur to a person skilled in this art and as would fall within the scope of the claims.

In the drawings:

Fig. 1 is a plan view of our improved drying apparatus, partly broken away.

Fig. 2 is a view partly in side elevation and partly in section of our improved apparatus.

Fig. 3 is a transverse sectional view through our improved drying apparatus, the heated air conduit being shown in elevation, and Fig. 4 is a fragmentary perspective view of the perforated wall portion.

Referring in detail to the drawings:

Our improved drying apparatus comprises a housing preferably made up of an upper substantially semi-cylindrical section 10 and a lower substantially semi-cylindrical section 11, said sections being secured together in any suitable manner as by means of the bolts 12 passing through the flanges 13 and 14 provided on said members and being mounted on end frames 15 and 16, said end frames being mounted in turn upon any suitable longitudinally extending supports such as the I-beams 17. The longitudinally extending members 17 also have a central supporting member 18 mounted thereon, said member 18 being provided with suitable feet 19 for receiving the members 17.

Mounted to one side of the housing formed of the members 10 and 11 is a heating device 20 which is provided with suitable heating means 21 therein for producing heated air and which is provided furthermore with suitable forced draft means 22 for setting up a current of air from the heating device 20 passing into the duct 23 from which the branch ducts 24, 25, 26 and 27 extend to the lower section 11 of the housing, said section being provided with a plurality of openings 28 therein aligning with the ducts, said openings 28 extending along the major portion of the bottom of the section 11 transversely of the device and up along the major portion of one side thereof. The ducts 24, 25, 26 and 27 may be of any desired shape so as to provide for the passage of the heated air readily therethrough into the housing of the machine, but are preferably all substantially shaped as shown in Figs. 1 and 3. Each of the ducts is provided with means for regulating the flow of air through the same, said means comprising dampers 29 which are mounted adjacent the entrances to said ducts from the duct 23 and are provided with suitable operating members in the form of handles 30 which may be held in any desired adjusted position by means of the racks 31, said racks being made in any desired manner, being shown in Fig. 3 as being made of a corrugated sheet metal member. It will accordingly be seen that the amount of heated air entering the housing of the machine may be regulated by means of the dampers at any point along the length of said housing.

Mounted on top of the upper housing section 10 in alignment with the tapering opening 32 is a tapering discharge duct 33, said duct increasing in height and width toward the vertical discharge conduit 34 and communicating therewith through an opening at 35, the conduit 34 also connecting with the housing through a bottom opening 36. The duct 33 is provided with a plurality of removable cover plates 37 whereby access may be had to the interior thereof and is further provided with a plurality of dampers 38, 39 and 40 which are of a size adapted to close said duct at various points along the length thereof or to regulate the size of the passage therethrough in any desired manner. Said dampers are operated by means of handles 41 which have means thereon engaging the racks 42 whereby said dampers may be set in any desired position and maintained in such position.

Mounted within the housing in the lower portion thereof and spaced from the lower section 11 of the housing is a perforated wall portion 43 which has the elongated slits or perforations 44 therein preferably arranged in staggered relation throughout the length and width of the member 43, thus providing a perforated bottom wall for the chamber within the housing spaced from the lower housing member 11, said perforated member 43 being secured to the lower housing member 11 by means of the flanges 45, extending along opposite edges thereof, in any desired manner, as by welding. The housing is provided with a discharge opening 46 at one end thereof and with an opening 47 near the upper end of the end member 15 leading into the interior of the housing above the perforated wall portion 43. A suitable feeding device is provided for feeding the material to be dried through the feed opening 47, which comprises a hopper 48 from which the tubular member 49 leads to a chamber 50 in which a rotatable feed screw 51 is mounted which is rotated in a direction to feed the material passing through the tubular member 49 through the opening 47 into the interior of the housing. The feed screw 51 is provided with a shaft 52 which is mounted in a bearing 53 depending from the end member 15 and a bearing member 54 mounted on the end wall of the chamber 50. The said shaft is further provided with a change speed pulley device 55 over which the belt 56 operates, said belt also operating on a co-operating change speed pulley means 57 provided on the main drive shaft 58. Said main drive shaft 58 is mounted in suitable bearings 59 on the members 15, 16 and 18 and on the frame members 60 which are provided in spaced relation to the end members 60 and 61, and a drive pulley 62 is provided on one end of said shaft 58 for receiving a belt for driving said shaft.

The shaft 58 is provided with sprockets 63 at opposite ends thereof between the bearings in the frame members 60 and 61 and the bearings in the members 15 and 16. Sprocket chains 64 operate over the sprockets 63 and pass over the sprockets 65 provided on the shaft 66. Said shaft 66 extends lengthwise through the housing substantially parallel to the axis thereof and is mounted in bearings 67 provided in the end members 15 and 16 and bearings 68 provided on the upper ends of the frame members 60 and 61. The shaft 66 is thus driven at opposite ends thereof by means of the sprocket chains 64 from the main drive shaft 58. Keyed to the shaft 66 at opposite ends of the housing and at a plurality of spaced points along the length thereof are spiders 69 which are provided with hub portions 70, spokes 71 and rim portions 72. The rim portions 72 of the spiders are provided with angular flanges 73 forming substantially channel-shaped lugs thereon at equally spaced points around said rim. Engaging with said lugs are the longitudinally extending angle members 74, the legs of which engage with adjoining faces of said lugs 73, being secured thereto in any desired manner. Mounted on the angles 74 and extending outwardly from the rim portions 72 of the spiders are the agitating members 75 which are preferably provided with a plurality of teeth 76 thereon, the members 75 being secured in any desired manner to said angles, as by means of the bolts 77. The members 75 are mounted on the angles 74 so that the same are situated substantially on a spiral, running along the outer surface of the agitating member taken as a whole, that is, beginning at the end of the agitating member adjacent the end member 15, a continuous spiral row of the members 75 extends around the agitating member to the end member 16. As a result the agitating member not only acts to agitate the contents of the housing above the perforated member 43 but also acts to carry the material toward the discharge opening 46 lengthwise of the housing, it being of course understood that the agitating member is rotated in the proper manner to accomplish this purpose.

It will be noted from the above that the material from the hopper 48 is fed into the housing positively by the feed screw 51 and that said material is thoroughly agitated by the agitating device while an upward current of heated air passes upward through the mass of material to thoroughly dry and cure the same. At the same time the material is constantly being moved toward the outlet 46 of the machine, and the rate of feed may be regulated, it will be noted, by adjusting the belt 56 on the sets of pulleys 55 and 57. Also the amount of heat and the quantity of air passing through the material can be regulated by means of the dampers 29 at all points along the travel of the material, the perforated wall permitting the heated air to pass evenly through the material and up into the discharge conduit 33. Furthermore the stream of air can be directed more or less in the desired direction through the housing due to the provision of the dampers 38, 39 and 40 in said discharge conduit.

What we claim and desire to secure by Letters Patent is:

1. A drier of the character described comprising an elongated body portion, means for feeding hay into one end of said body portion, a discharge outlet at the other end of said body portion, spaced inlets for heating medium opening into said body portion, an outlet for said heating medium, agitating means in said body portion conveying the hay toward said discharge outlet, said outlet including a passage serving all of said inlets and having an outlet arranged adjacent the end of the body portion at which the hay is fed to said body portion, and means in said outlet passage for interrupting flow of air therethrough.

2. A drier of the character described comprising an elongated body portion, means for feeding hay into one end of said body portion, a discharge outlet at the other end of said body portion, spaced inlets for heated air entering said body portion near the bottom thereof, an outlet for said air near the top of said body portion, agitating means in said body portion arranged between the inlet and outlet; conveying the hay toward said discharge outlet, said outlet including a passage serving all of said inlets and having an outlet arranged adjacent the end of the body portion at which the hay is fed to said body portion, and dampers in said outlet passage dividing the passage into separate chambers.

3. A drier of the character described, comprising an elongated body portion, means for positively feeding hay into one end of said body portion, a discharge outlet at the other end of said body portion, spaced inlets for heated air entering said body portion near the bottom thereof, an outlet for said air near the top of said body portion, agitating means in said body portion conveying the hay toward said discharge outlet, said outlet including a passage serving all of said inlets and having an outlet arranged adjacent the end of the body portion at which the hay is fed to said body portion, and dampers arranged at spaced intervals throughout the length of the outlet passages.

4. A drier of the character described, comprising an elongated body portion, a perforated wall spaced from the bottom of said body portion, means for admitting heated air to said body portion at intervals below said perforated wall, an agitating device mounted above said wall, said outlet including a passage serving all of said inlets and having an outlet arranged adjacent the end of the body portion at which the hay is fed to said body portion, and dampers arranged at spaced intervals throughout the length of the outlet passage forming variable chambers therein.

5. A drier of the character described, comprising an elongated body portion, a perforated wall spaced from the bottom of said body portion, means for admitting heated air to said body portion below said perforated wall at intervals of the body portion, and an agitating device mounted above said wall, said agitating device comprising a rotatable member having a plurality of agitating members projecting therefrom, said agitating members collectively moving the material being dried lengthwise of said body portion, and a discharge outlet arranged above the means for admitting heated air to the body portion, said outlet having means providing separate compartments which communicate with each other.

6. A drier of the character described, comprising an elongated body portion, a perforated wall spaced from the bottom of said body portion, means for admitting heated air to said body portion below said perforated wall at intervals of the body portion, and an agitating device mounted above said wall, said agitating device comprising a rotatable member having a plurality of agitating members projecting therefrom and a discharge outlet arranged at one side of the means for admitting heat and having means whereby separate compartments are provided which communicate with said outlet.

7. A drier of the character described, comprising an elongated body portion, a perforated wall spaced from the bottom of said body portion, means for admitting heated air to said body portion below said perforated wall, and an agitating device mounted above said wall, said agitating device comprising a rotatable member having a plurality of toothed agitating members projecting therefrom, and a discharge outlet arranged at one side of the means for admitting heat, means arranged in said outlet providing chambers in said outlet, the walls of which may be moved to regulate the escape of heated air from the chambers to the outlet.

8. A drier of the character described comprising an elongated body portion, an agitator arranged in said body portion, means for introducing heated air at intervals to the body portion, an air outlet arranged at one side of the agitator, said outlet being divided to form a plurality of communicating compartments which are respectively arranged diametrically opposite the heated air inlets.

9. A drier of the character described comprising an elongated body portion, an agitator arranged in said body portion, means for introducing heated air at intervals to the body portion, an air outlet arranged at one side of the agitator, said outlet being divided to form a plurality of communicating compartments which are respectively arranged diametrically opposite the heated air inlets, one of said compartments opening into the atmosphere.

10. A drier of the character described comprising an elongated body portion, an agitator arranged in said body portion, means for introducing heated air to said body portion, and a plurality of compartments which communicate with the atmosphere, said compartments having means for separately controlling the discharge of heated air from said compartments.

11. A drier of the character described comprising an elongated body portion, an agitator arranged in said body portion, means for introducing heated air to said body portion, and a plurality of compartments which communicate with each other and with the atmosphere, one of said compartments being directly open to the atmosphere and arranged at an end of the body at which hay is fed to the body portion.

12. A drier of the character described, comprising an elongated chamber, means for supplying a forced draft of heated air thereto at a plurality of points, means for regulating the supply of heated air entering said chamber at each of said points, agitating means in said chamber and means for discharging the heated air therefrom, said last mentioned means comprising a plurality of ducts, having means therein for regulating the effective size thereof.

In testimony whereof we affix our signatures.

COMPTON J. TUCKER.
LIONEL J. CHAPMAN.